US010572034B2

(12) United States Patent
Stotzem et al.

(10) Patent No.: US 10,572,034 B2
(45) Date of Patent: *Feb. 25, 2020

(54) INPUT DEVICE WITH A FINGERPRINT SENSOR AND A FORCE SENSOR ASSOCIATED WITH THE FINGERPRINT SENSOR

(71) Applicant: PREH GMBH, Bad Neustadt A.D. Saale (DE)

(72) Inventors: Manuel Stotzem, Wuelfershausen (DE); Andreas Kail, Bad Neustadt A. D. Saale (DE); Markus Klein, Salz (DE)

(73) Assignee: PREH GMBH, Bad Neustadt A.D. Saale (DE)

( * ) Notice: Subject to any disclaimer, the term of this patent is extended or adjusted under 35 U.S.C. 154(b) by 120 days.

This patent is subject to a terminal disclaimer.

(21) Appl. No.: 15/784,196

(22) Filed: Oct. 16, 2017

(65) Prior Publication Data

US 2018/0107295 A1    Apr. 19, 2018

(30) Foreign Application Priority Data

Oct. 18, 2016 (DE) .................. 10 2016 119 845

(51) Int. Cl.
*G06F 3/038* (2013.01)
*G06F 3/0354* (2013.01)
(Continued)

(52) U.S. Cl.
CPC ......... *G06F 3/03547* (2013.01); *B62D 1/046* (2013.01); *G06F 3/038* (2013.01);
(Continued)

(58) Field of Classification Search
CPC combination set(s) only.
See application file for complete search history.

(56) References Cited

U.S. PATENT DOCUMENTS

2010/0220900 A1    9/2010   Orsley
2011/0298711 A1   12/2011   Dean et al.
(Continued)

FOREIGN PATENT DOCUMENTS

DE    199 41 947 A1    3/2001
DE    100 04 965 A1    8/2001
(Continued)

*Primary Examiner* — Temesghen Ghebretinsae
*Assistant Examiner* — Sosina Abebe
(74) *Attorney, Agent, or Firm* — Norman B. Thot

(57) ABSTRACT

An input device includes a fingerprint sensor, an operating layer having a first operating surface, at least one force sensor, and an evaluation unit. The first operating surface has an acquisition surface which acquires a fingerprint of a finger of an operator via the fingerprint sensor. The at least one force sensor measures an operating force of the finger of the operator acting on the first operating surface. The evaluation unit is electrically conductively connected with the fingerprint sensor and with the at least one force sensor. The evaluation unit assigns at least one first switching function to the operating force applied on first operating surface of the operating layer if the operating force measured on the first operating surface exceeds a first threshold value.

6 Claims, 2 Drawing Sheets

(51) Int. Cl.
*G06K 9/00* (2006.01)
*B62D 1/04* (2006.01)
*G06F 3/042* (2006.01)
*G06F 3/044* (2006.01)

(52) U.S. Cl.
CPC .............. *G06F 3/042* (2013.01); *G06F 3/044* (2013.01); *G06K 9/0002* (2013.01); *G06K 9/00013* (2013.01); *G06F 2203/0338* (2013.01); *G06F 2203/04105* (2013.01)

(56) References Cited

U.S. PATENT DOCUMENTS

| 2013/0106693 | A1* | 5/2013 | Okuyama | G06F 3/0482 |
| | | | | 345/157 |
| 2015/0253922 | A1* | 9/2015 | Goodlein | G06F 3/0488 |
| | | | | 345/173 |
| 2015/0291032 | A1* | 10/2015 | Kim | B60K 37/06 |
| | | | | 701/36 |
| 2016/0140379 | A1* | 5/2016 | Pedersen | G06K 9/00919 |
| | | | | 726/19 |
| 2017/0351896 | A1* | 12/2017 | Jiang | G06F 21/32 |

FOREIGN PATENT DOCUMENTS

| DE | 10 2005 042 830 A1 | 3/2007 |
| DE | 10 2011 102 341 A1 | 12/2011 |

* cited by examiner

INPUT DEVICE WITH A FINGERPRINT SENSOR AND A FORCE SENSOR ASSOCIATED WITH THE FINGERPRINT SENSOR

CROSS REFERENCE TO PRIOR APPLICATIONS

Priority is claimed to German Patent Application No. DE 10 2016 119 845.5, filed Oct. 18, 2016. The entire disclosure of said application is incorporated by reference herein.

FIELD

The present invention relates to an input device with a fingerprint sensor, in particular a steering wheel with a fingerprint sensor disposed thereon.

BACKGROUND

Fingerprint sensors for personalizing a man-machine interface and methods for the personalization thereof have previously been described. Machines such as motor vehicles can be operated by a man-machine interface. For this purpose, they may in particular have input devices, for example, in the form of buttons and/or the like. A man-machine interface of a motor vehicle usually has a steering wheel via which steering inputs for controlling the transverse dynamics of a motor vehicle can be inputted. Man-machine interfaces of motor vehicles may also have display devices via which feedback to operating instructions, operating tips, and/or information for a user of the motor vehicle can be provided.

The personalization of man-machine interfaces of motor vehicles so that a configuration and/or an appearance of the man-machine interface are designed differently for different users has also previously been described. DE 10 2005 042 830 A1 describes an apparatus and a method for setting internal vehicle functions and/or devices in a user-specific manner wherein, for at least one user, at least one user-specific data set containing at least one personal user profile of the user can be stored in the memory of an internal vehicle computing unit and/or in a portable memory unit, respectively, the user can be identified by at least one personal identifier, internal vehicle functions and/or devices can be automatically configured in a user-specific manner by the personal user profile, and at least the part of the user-specific data set including the personal user profile can be encrypted and decrypted only after a successful identification of the user, which identification is carried out by the personal identifier. A biometric identification of the user is in particular carried out by devices suitable therefor. The latter have, for example, a scanner for scanning fingerprints. DE 199 41 947 A1 describes operating members for an instrument cluster and a central display, wherein the operating members are integrated into a steering wheel of the motor vehicle, wherein the operating member for the central display is disposed on the half of the steering wheel facing towards the central display, and the operating member for the instrument cluster is disposed on the half of the steering wheel facing towards the instrument cluster.

A drawback of the above-mentioned man-machine interfaces is that the fingerprint sensor provided for personalization can only be used for personalization, and not for other purposes.

SUMMARY

An aspect of the present invention is to provide an input device in which the fingerprint sensor provided for acquiring biometric data can be employed for other purposes.

In an embodiment, the present invention provides an input device which includes a fingerprint sensor, an operating layer comprising a first operating surface, at least one force sensor, and an evaluation unit. The first operating surface comprises an acquisition surface which is configured to acquire a fingerprint of a finger of an operator via the fingerprint sensor. The at least one force sensor is configured to measure an operating force of the finger of the operator acting on the first operating surface. The evaluation unit is electrically conductively connected with the fingerprint sensor and with the at least one force sensor. The evaluation unit is configured, if the operating force measured on the first operating surface exceeds a first threshold value, to assign at least one first switching function to the operating force applied on first operating surface of the operating layer

BRIEF DESCRIPTION OF THE DRAWINGS

The present invention is described in greater detail below on the basis of embodiments and of the drawings in which.

DETAILED DESCRIPTION

Figure 1:
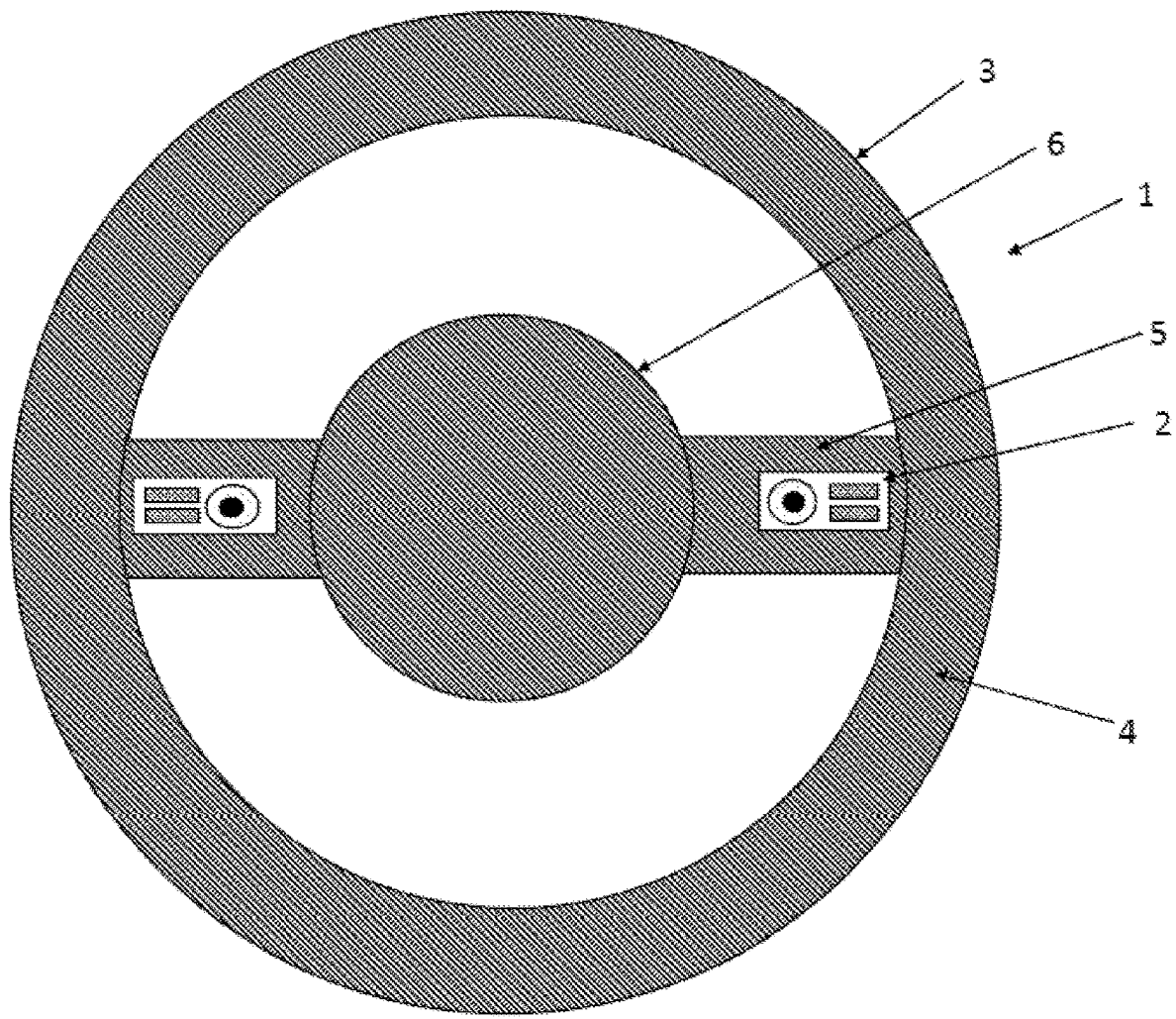
FIG. 1 shows a man-machine interface 1 according to the present invention which comprises an embodiment of the input device 2 according to the present invention.

The present invention relates to an input device comprising a fingerprint scanner and an operating layer defining a first operating surface. In this case, the first operating surface further comprises an acquisition surface for acquiring a fingerprint of a finger of an operator via the above-mentioned fingerprint scanner. This can, for example, be a fingerprint sensor that is suitable for acquiring a print of the finger, in particular the papillary lines of a stationary finger, or at least some portions thereof. This fingerprint sensor is also referred to as a fully automatic fingerprint sensor. A number of different methods can be used to scan the papillary lines according to the present invention. These include: optical sensors, electrical field sensors, polymer TFT sensors (TFT—thin film transistor), thermal sensors, capacitive sensors, contactless 3D-sensors, and ultrasonic sensors.

The hardware component of a biometric system, which at first supplies the biometric measurement data, is referred to as a fingerprint sensor according to the present invention. This is a special form of a biometric sensor. Depending on the biometric method used, various types of sensors may be used according to the present invention. Optical sensors use light to acquire an image of the fingerprint. Electrical field sensors measure the local variation of the electrical field that is produced on the contours of the surface of the finger when a small electrical signal is emitted. Polymer TFT sensors measures the light emitted in the polymer substrate where a contact takes place when the finger is placed thereon. Thermal sensors register the thermal image of the finger placed thereon. For capacitive sensors, the sensor surface together with the surface of the finger forms a capacitor whose capacitance changes due to the contour of the skin (ridges and grooves). These local changes are measured and represent the fingerprint.

In an embodiment of the present invention, an optical or capacitive fingerprint sensor can, for example, be used, for example, an optical fingerprint sensor emitting infrared light. The respective fingerprint sensor used in accordance with the present invention is used together with an evaluation unit, i.e., a data processing module, as a so-called on-line system. It is relatively easy to immediately check the quality of the recorded fingerprints since a feedback to the image processing algorithm exists in the on-line method.

The fingerprint of a living subject is usually recorded by lightly placing the finger of the user on the acquisition surface of the fingerprint sensor. In this case, the scan can of course only capture those papillary lines that are in direct contact with the acquisition surface.

The print of a living subject therefore results in the recording of only a portion of the surface of the finger.

The input device according to the present invention has at least one force sensor. Several force sensors can, for example, be disposed in an array. The force sensor or force sensors is/are thereby configured to measure an operating force acting on the operating surface.

As was explained above, an evaluation unit is also provided to evaluate the biometric data obtained by the fingerprint sensor. The evaluation unit is connected in an electrically conductive manner with the fingerprint sensor and with the force sensor. The evaluation unit is further configured, in the event of an operation of the first operating surface, in particular by a finger, with an operating force exceeding a first threshold value, to assign a switching function to this operation. For example, a running state of a unit in the vehicle is changed by a digital switching function. The evaluation unit can, for example, be configured, solely in the event of a touch or operation with an operating force below the first threshold value, to run the fingerprint sensor in a mode in which the fingerprint of the operator is acquired. The risk of a non-detectability due to an excessive finger contact pressure is thus avoided.

In an embodiment of the present invention, the fingerprint sensor and the evaluation unit can, for example, be further configured to be run in a control mode in order to detect a movement of the finger on the acquisition surface in order to carry out a cursor control, i.e., to move a cursor on an electronic display as synchronously as possible with the movement of the finger on the acquisition surface.

In an embodiment of the present invention, the above-mentioned switching function can, for example, be a switching function that does not take biometric data into account. This is a confirmation function which can, for example, be used in the cursor control. A switching function taking into account biometric data would be understood to be a function that stops the scanning process when a threshold value is exceeded, or interrupts it because a risk of non-detectability exists due to an excessive finger contact pressure.

In an embodiment of the present invention, it is provided that, in the control mode, the movement can, for example, be detected by the speckle interference pattern generated by the fingerprint sensor.

In an embodiment of the present invention, the operating layer can, for example, have a at least one second operating surface which is disposed outside the first operating surface and which is also subject to the detection by a force sensor, and wherein the evaluation unit is configured, in the event of an operation of the second operating surface, in particular by a finger, where an operating force exceeds a second threshold value, to assign a switching function thereto. A running state of a unit in the vehicle can, for example, be changed by the second switching function.

The first threshold value can, for example, differ from the second threshold value.

In an embodiment of the present invention, a means for the spatially resolving detection of the touch on the operating layer can, for example, be provided in order to verify, for example, at least the operation of the second operating surface. The spatially resolving detection can, for example, be capacitively carried out independently of the force sensors forming the force sensor system. This can, for example, be provided as an array of electrodes which generates several measuring capacitances whose change or manipulation by the finger of the user is detected in a spatially resolving manner by the evaluation unit.

In an embodiment of the present invention, the means for the spatially resolving detection of the touch can, for example, be configured to comprise the at least one force sensor. An array of force sensors, for example, an array of capacitive force sensors, can, for example, be provided to carry out the spatially resolving detection of the touch and the operation.

The present invention further relates to a man-machine interface which comprises a steering wheel and an input device according to any one of the previously described embodiments attached to the steering wheel.

The present invention also relates to the use of the input device in one of the above-described embodiments in a motor vehicle.

In an embodiment, the present invention also relates to an inputting method comprising the following steps. In a providing step, there is provided: a fingerprint scanner, an operating layer defining a first operating surface, wherein the operating surface further comprises an acquisition surface for acquiring a fingerprint of a finger of an operator, at least one force sensor configured to measure an operating force acting on the first operating surface, and an evaluation unit, which is connected in an electrically conductive manner with the fingerprint sensor and the force sensor. In a measuring step, the operating force acting on the first operating surface, is measured by the force sensor. The measurement can, for example, be carried out continuously or successively in a time sequence.

In an embodiment of the present invention, a step of assigning at least one switching function to an operation of the operating layer by the evaluation unit can, for example, be provided if an operating force exceeding a first threshold value was measured in the measuring step. However, no assignment takes place if, for example, a lower measurement value or a measurement value corresponding to the threshold value is measured.

In an embodiment of the present invention, the inputting method according to the present invention has at least one switching function that does not take biometric data into account, such as a confirmation function used in the cursor control.

Other embodiments according to the present invention of the inputting method are conceivable in addition to the above-described embodiments which have one or a combination of the features described above with respect to the input device.

The present invention is explained in greater detail below under reference to the drawings. The drawings are to be understood only as examples and merely represent an embodiment.

Figure 2:
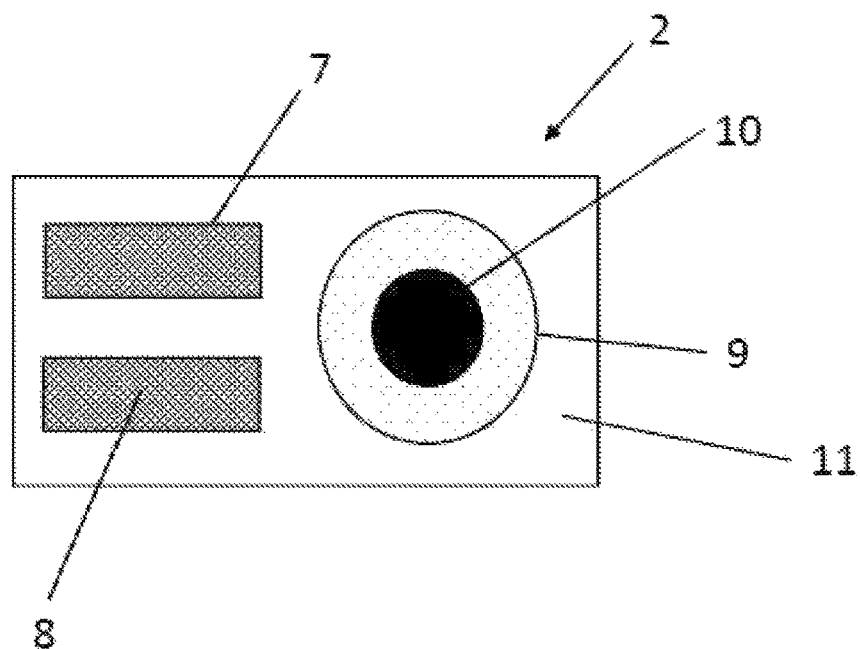
FIG. 2 shows a top view of the input device 2 from FIG. 1.
Figure 3:
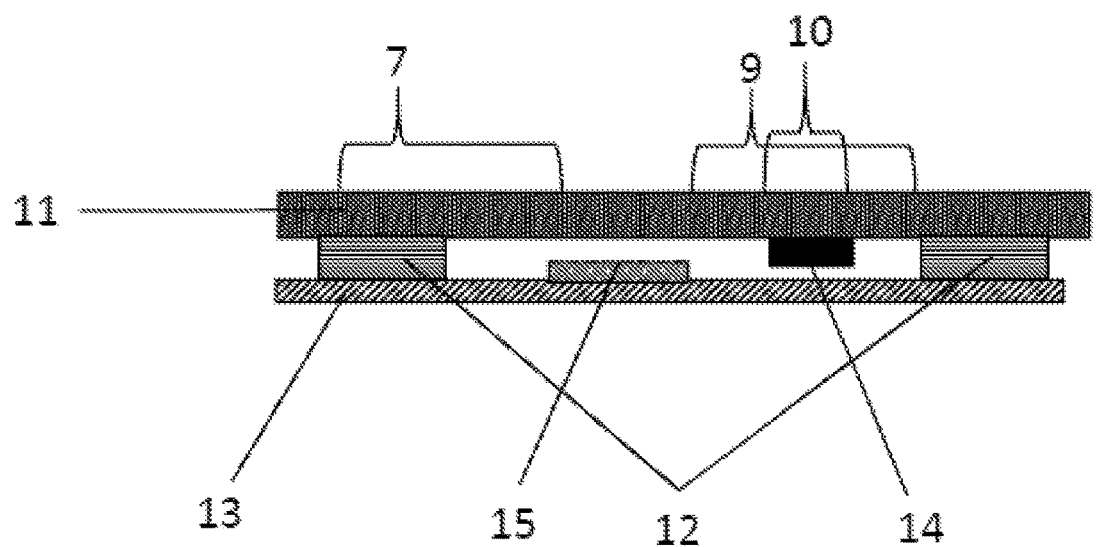
FIG. 3 shows a sectional view through the embodiment of the input device according to the present invention from FIG. 2.

FIG. 1 shows a man-machine interface 1 according to the present invention in a motor vehicle (which is not shown in detail). The man-machine interface 1 according to the present invention has a steering wheel 3 with an outer steering wheel rim 4 and an inner impact absorber 6 which holds the steering wheel rim 4 through two diametrically opposed steering wheel spokes 5. An input device 2 is integrated into each of the steering wheel spokes 5. The input device 2 is shown in a top view in FIG. 2 and in a cross-section in FIG. 3. The input device 2 is shown in detail in FIG. 3. The input device 2 has an outer input layer or operating layer 11 having a first operating surface 9 and several second operating surfaces 7, 8. The first operating surface 9 comprises an acquisition surface 10, which is concentrically disposed. The acquisition surface 10 is associated with a fingerprint sensor 14. The fingerprint sensor 14 scans the acquisition surface 10 optically in order to determine biometric data of a finger resting against the acquisition surface 10 or to carry out a cursor control in a control mode by a sliding movement of the finger across the acquisition surface 10. The operating layer 11 is supported on a base 13 by an array of force sensors 12. The force sensors 12 serve to determine the force, but also to determine the location of action of the operating force on the operating layer 11, via the data determined by the force sensors 12 being transmitted to an evaluation unit 15. A switching function is assigned to the operation in the area of the first operating surface 9 in the event an operating force exceeds a predetermined threshold value. This is, for example, a confirmation function after completing a selection during the cursor control in the control mode. In addition to the first operating surface 9, the operating layer 11 defines further second operating surfaces whose operation is detected by the array of force sensors 12 and assigned to a switching function by the evaluation unit 15.

The features cited individually in the appended claims can be combined with each other in any technologically meaningful manner and thereby represent other embodiments of the present invention. The description, in particular in connection with the drawings, additionally characterizes and specifies the present invention.

What is claimed is:

1. An input device comprising:
   a fingerprint sensor;
   an operating layer comprising a first operating surface and at least one second operating surface which is arranged outside the first operating surface,
      the first operating surface comprising an acquisition surface which is configured to acquire a fingerprint of a finger of an operator via the fingerprint sensor, and
      the at least one second operating surface comprising means for the spatially resolving detection of a touch which comprises an array of force sensors, the means for the specially resolving detection of a touch being configured to verify an operation of the at least one second operating surface;
   at least one force sensor configured to measure an operating force of the finger of the operator acting on the first operating surface; and
   an evaluation unit which is electrically conductively connected with the fingerprint sensor and with the at least one force sensor, the evaluation unit being configured, if the operating force measured on the first operating surface exceeds a first threshold value, to assign at least one first switching function to the operating force applied on first operating surface of the operating layer, wherein,
   only if the operating force measured on the first operating surface does not exceed the first threshold value, the evaluation unit is further configured to run the fingerprint sensor in a mode in which the fingerprint of the operator is acquired,
   the fingerprint sensor and the evaluation unit are further configured to be run in a control mode in order to detect a movement of the finger on the acquisition surface in order to carry out a cursor control,
   the at least one force sensor is further configured to measure an operating force of the finger acting on the at least one second operating surface,
   the evaluation unit is further configured, if the operating force measured on the at least one second operating surface exceeds a second threshold value, to assign a second switching function to the operating force applied to the at least one second operating surface of the operating layer, and
   the first threshold value differs from the second threshold value.

2. The input device as recited in claim 1, wherein, the fingerprint sensor is further configured to generate a speckle interference pattern, and
   in the control mode, the movement is detected via the speckle interference pattern.

3. The input device as recited in claim 1, wherein at least one first switching function of the at least one first switching function does not take biometric data into account.

4. The input device as recited in claim 3, wherein the biometric data is a confirmation function used in the cursor control.

5. The input device as recited in claim 1, wherein the means for the spatially resolving detection of a touch comprises at least one force sensor.

6. A man-machine interface comprising:
   a steering wheel; and
   the input device as recited in claim 1 is attached to the steering wheel.

* * * * *